April 10, 1962  E. W. CLARK  3,029,388
ELECTRICAL MEASURING INSTRUMENT
Filed Jan. 4, 1960  2 Sheets-Sheet 1

INVENTOR.
EARL W. CLARK
BY
Irving M. Freedman
HIS ATTORNEY

United States Patent Office 3,029,388
Patented Apr. 10, 1962

3,029,388
ELECTRICAL MEASURING INSTRUMENT
Earl W. Clark, Saugus, Mass., assignor to General
Electric Company, a corporation of New York
Filed Jan. 4, 1960, Ser. No. 281
15 Claims. (Cl. 324—147)

This invention relates to electrical measuring instruments and particularly to instruments of the moving vane type.

In the moving vane type of electrical measuring instrument an electrically energized field coil generates a magnetic field which induces magnetic flux in a pair of relatively movable vanes. Interaction between the induced magnetic fields causes the rotatable vane to move against a biasing force in a direction to increase the inductance of the system.

It is often desirable to obtain a deflection of the instrument indicator fastened to the movable vane that is directly proportional to the measured quantity supplied to the instrument so as to provide scale divisions indicative of equal increments of applied voltage or current of equal length. Such linear scales avoid excessive crowding at one end of the scale and facilitate accurate readings. Also, linear deflection characteristics enable the use of preprinted indicating scales thus eliminating the need for individual scale calibration. In the moving vane type of electrical measuring instrument the dynamic torque which causes the rotatable vane to move varies as the square of the current through the energizing coil at any particular scale point. The biasing force resisting this driving torque is produced by a spring having a torque which varies directly as a function of the angle of deflection of the rotatable vane. Therefore, it is inherently difficult to provide an instrument having linear deflection versus current characteristics in the presence of such simultaneously acting opposing forces. The provision of a linear deflection characteristic is further complicated by the fact that the electrical impedance and magnetic reluctance of the component parts of the instrument tend to vary over the operating range of the instrument in a complex and often unpredictable manner.

It is desirable to provide an instrument having an indicating pointer that will rapidly respond to variations of the magnitude of input current. While the physical mass of the movable vane and its friction and windage loss may be reduced within limits, the movable vane must be large enough to accommodate a sufficient magnetic flux to move the vane and its associated indicating pointer upscale. Also, it is desirable to provide as compact a unit as possible without unduly reducing the size of the indicating scale. Since the rotatable vane that drives the indicating pointer is normally positioned within an aperture of the energizing coil, it is seen that the overall size of such instruments is a function of the dimensions of the coil.

Accordingly, it is one object of my invention to provide an improved electrical measuring instrument in which a linear pointer deflection versus electrical input characteristic is provided over the entire operating range.

An additional object of my invention is to provide an improved electrical measuring instrument having means to compensate for unpredictable variations in the electrical and magnetic characteristics of the component parts of the instrument.

A further object of my invention is to provide an improved electrical measuring instrument of relatively high torque having an indicating pointer that is movable through a maximum linear distance for a given energizing coil input.

A still further object of my invention is to provide an improved electrical measuring instrument having a fast response time.

Another object of my invention is to provide an improved electrical measuring instrument having an increased torque to flux density characteristic.

Yet another object of my invention is to provide an improved electrical measuring instrument including means to adjust the deflection characteristics to correspond with graduations on a preprinted indicating scale.

The above objects, as well as the advantages and other objects of the invention, will be apparent from the following description when considered in conjunction with the accompanying drawings, in which.

Briefly stated, in accordance with one embodiment of my invention, I provide an electrical measuring instrument comprising a coil adapted to be energized by the electrical signal being measured, and having an axial aperture. A U-shaped iron vane is rotatably mounted in inductive relation with the coil and is tapered to reduce its cross-sectional area and improve the response time of the vane. A magnetizable plate is arranged over one end of the coil aperture in inductive relation with the free end of the rotatably mounted vane to establish a relationship between the movable vane and the magnetizable plate that is effective over operating range of the vane to counteract a spring biasing force applied to the vane. The deflection of the indicating pointer of the instrument is made substantially directly proportional to increments of current applied to the energizing coil. Minor deviations in the deflection characteristics of the indicating pointer which are caused by unpredictable variations in the magnetic and electrical characteristics of the component parts of the instrument are compensated for by manually adjustable magnetizable screws positioned adjacent the air gap between the movable vane and the magnetizable plate. The deflection characteristics of the movable vane may be further controlled by tapering the sidewalls of the axial aperture through the energizing coil in such a manner that the walls tending to limit the rotary movement of the iron vane lie in planes that substantially intersect the axis of rotation of the vane so the air gap between these walls and the vanes is reduced and the magnetic coupling therebetween is improved.

Figure 1:
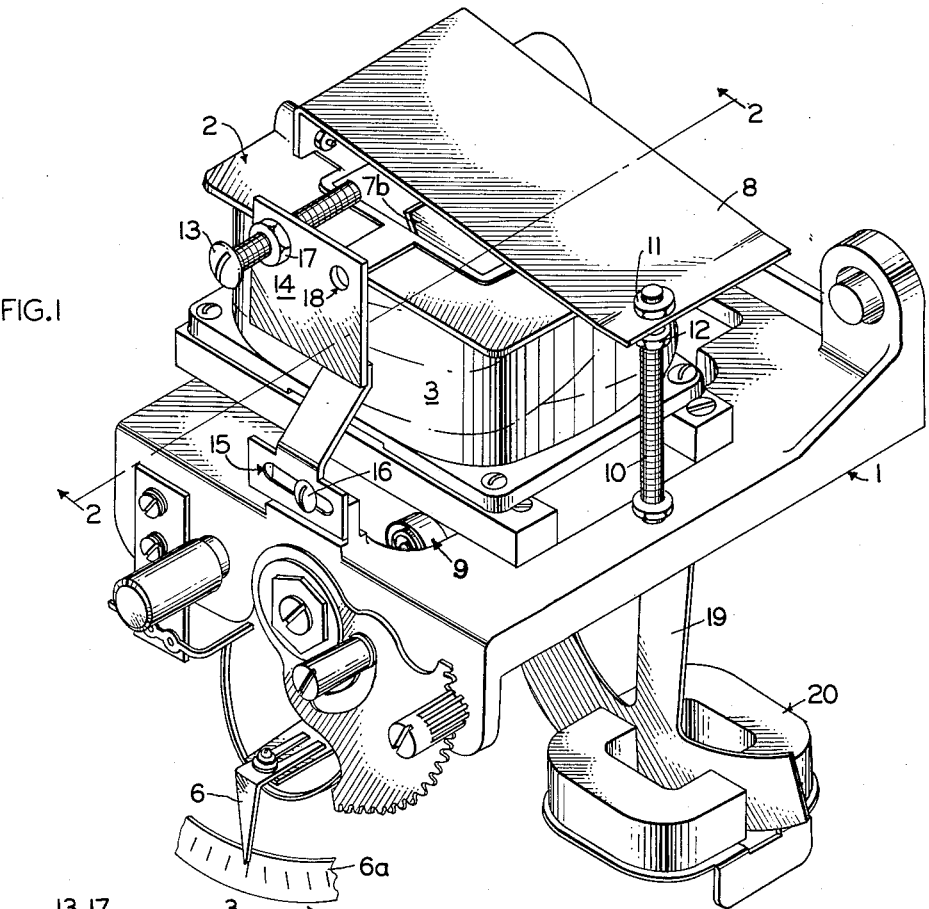
FIG. 1 is a perspective view of an electrical measuring instrument constructed in accordance with the principles of my invention.
Figure 2:
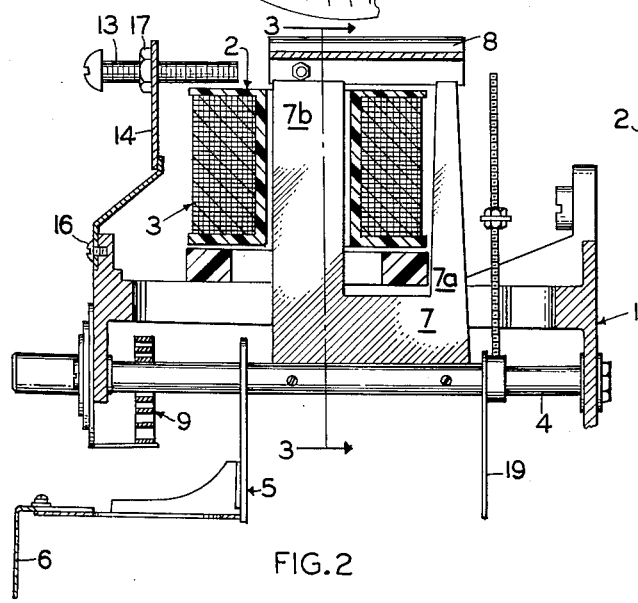
FIG. 2 is a sectional side elevation view, taken along plane 2—2 of FIG. 1.

FIGS. 1 and 2 of the drawing show the relative positions of the component parts of an electrical measuring instrument incorporating my invention. Referring to these figures, the instrument structure includes a pre-shaped coil winding form 2 mounted on the frame 1 by a plurality of screws, or other suitable fastening means. Coil 3 is wound on form 2 and is provided with electrical connections (not shown) to connect the instrument to the electrical quantity being measured. A rotatably mounted shaft 4 is coupled through a bracket 5 to an indicating pointer 6 which co-operates with a preprinted scale 6a or other suitable graphic means to indicate the angular deflection of the instrument. A U-shaped iron vane 7 is fastened to the rotatable shaft 4, and positioned so that its legs 7a and 7b are respectively inside and outside coil 3. The legs 7a and 7b are substantially parallel to each other and in inductive relation with the coil 3. A resilient iron plate member 8 is fastened to the upper surface of the coil winding form 2 in inductive relation with the coil 3 and the rotatable vane 7. Current flow through coil 3 sets up a magnetic field which induces flux in both the rotatable vane 7 and the plate member 8 to attract vane 7 toward the relatively fixed plate member 8 and the side of the coil having the smaller air gap thus causing a rotation of shaft 4 against the bias of spring 9.

Pointer 6, attached to shaft 4, is deflected an amount related to the magnitude of the current. It is desirable that the deflection characteristics of the instrument be substantially linear over the full scale of the instrument; that is, that pointer 6 be deflected through the same angular increment by a given change of current whether the pointer 6 is adjacent the upper end or the lower end of its scale. As pointed out above, the attainment of a linear deflection characteristic is complicated by the fact that the biasing force supplied by the spring 9 varies as a function of the angular deflection of the pointer 6, whereas the attraction force between the rotatable vane 7 and the plate member 8 varies as the square of the current flow through coil 3 at any particular scale point.

Plate member 8 is provided to make it possible to obtain linear deflection characteristics. Plate member 8 is formed and mounted on winding form 2 such that the free or deflectable end thereof is normally spaced from from the upper surface of the form and the opposite or fixed end is spaced a still greater distance from the form. An air gap is thus provided between the plate member 8 and the rotatable vane 7 which varies in a progressive manner from a maximum length adjacent the downscale position of the vane 7 to a much smaller length adjacent the upscale position of the vane 7. The initial slope of the plate member 8 with respect to the form 2 may be varied by bending the member 8 to a desired configuration that is dependent on the desired scale distribution. The exact slope of the plate member 8 may be selectively adjusted by an adjusting screw 10 and nuts 11 and 12 positioned respectively above and below the plate member. The screw 10 passes through an opening in plate 8 and is supported by suitable means on frame 1.

In addition to the compatibility in the rates of change between the spring biasing force and the magnetic attraction force applied to vane 7, the deflection characteristics of indicating pointer 6 are often unpredictable because of small variations in the magnetic and electrical characteristics of the component parts of the measuring instrument. To compensate for such variations, a screw 13 of iron or other magnetizable material is provided in an adjustable bracket 14 adjacent the air gap between the rotatable vane 7 and the plate member 8. The bracket 14 includes slot 15 to enable adjustment to various longitudinally spaced positions along the air gap. A screw 16 tapped into frame member 1 secures the bracket 14 in any of its longitudinal positions. By adjusting the longitudinal position of bracket 14 and the axial position of screw 13 it is possible to vary the reluctance of the air gap between vane 7 and plate member 8 at any given area along the air gap. Any tendency of the instrument to deflect sporadically at any portion of the scale can be compensated for by adjusting the position of screw 13 adjacent the air gap at that portion of the scale. A lock nut 17 on screw 13 may be moved against the bracket 14 to secure the screw 13 in its adjusted position.

If the deflection characteristic of the indicating pointer 6 varies at several different points along the scale, additional compensating screws may be provided such as in the threaded aperture 18 along bracket 14 in the region of the air gap between vane 7 and plate member 8. Alternatively, several compensating screws, such as screw 13, may be mounted so as to be movable relative to each other in a longitudinal direction in a slot along the air gap to provide selective variation of the reluctance of the air gap.

It will be seen that by adjusting the position of plate member 8 and screw or screws 13 it is possible to adjust the deflection characteristics of indicating pointer 6 to provide a linear characteristic which co-operates exactly with a preprinted scale 6a having equal increments of current indicated by equally sized graduations.

Figure 3:
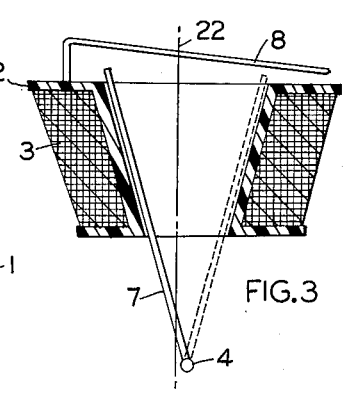
FIG. 3 is a sectional view taken along plane 3—3 of FIG. 2 showing a portion of the instrument shown in FIG. 2.

In order to further control the deflection characteristics of my instrument and make it suitable for other desired scale distribution, two of the walls of coil winding form 2 may be tapered, as best tapered, as best shown in FIG. 3. As will be seen by reference to FIG. 3, the two walls of the form 2 which are tapered lie in planes intersecting shaft 4 and are those walls that tend to limit the upscale and the downscale movement of the rotatable vane 7. Shaft 4 is slightly displaced in the upscale direction from axis 22 which passes through the center of coil 3. By tapering the walls of form 2 it is possible to reduce the outside width of the coil 3 adjacent one end thereof. Besides facilitating the reduction of the instrument size the tapered coil increases the deflection torque characteristics of the rotatable vane 7 through improved magnetic coupling by allowing the coil 3 to be positioned as close as possible to the rotatable vane 7 over the entire length of the vane when it is in the region of the maximum upscale or downscale positions thus improving the magnetic coupling therebetween. A tapered coil has been found to be especially advantageous in moving vane instruments which include a repulsion vane as shown in FIG. 4.

Figure 4:
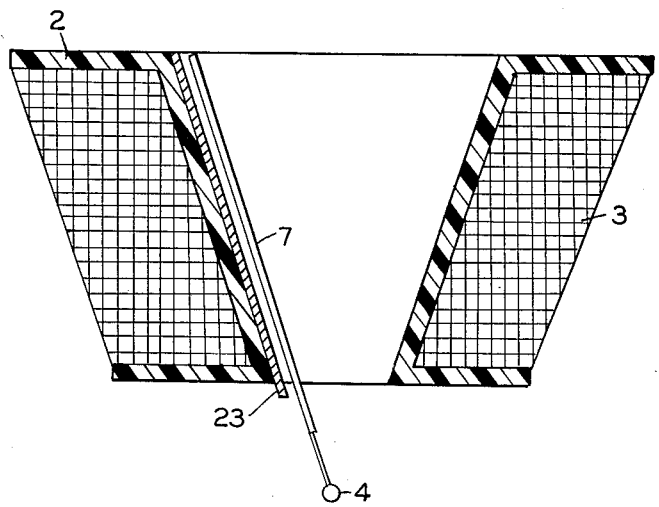
FIG. 4 is an alternate embodiment of the arrangement shown in FIG. 3.

Referring to FIG. 4, it will be seen that the fixed vane 23, similar to the rotatable vane 7, lies along one side of the tapered coil 3. Current flow through coil 3 induces magnetic fields in vanes 7 and 23 which interact such that vane 7 repels vane 23 in a manner well known in the art. The tapered coil very effectively modifies the scale distribution characteristics at the ends of the scale. The arrangement of FIG. 4 or that of FIG. 3 may be used in conjunction with the plate member 8 and compensating screws 13 to obtain desired scale distribution characteristics.

The deflection characteristics of the rotatable vane 7 may be further tailored by the shaping of the rotatable vane. The cross sectional area and moment of inertia of rotatable vane 7 have been reduced to increase the speed of response thereof by tapering the leg 7a that is disposed outside of the coil 3 as shown in FIG. 2. I have found that the concentration of magnetic flux varies around the coil 3 from a maximum in the axial aperture therethrough to a minimum adjacent the top outside corner thereof. Tapering the outer leg 7a of vane 7 in the manner indicated provides more nearly uniform flux density in all of the portions of the vane. The deflection characteristics of the vane are thus improved by reducing its mass and inertia while at the same time maintaining its torque developing characteristics at a given level. The cross sectional area of leg 7a may also be reduced by punching out portions of the leg 7a to vary the flux density as described over the length of leg 7a. Alternatively, both the width and thickness may be varied to effect a reduction in cross-sectional area. However, the cross-sectional area of the various portions of vane 7 should be of sufficient size to accommodate sufficient magnetic flux for movement of the rotatable vane in a desired manner.

The improved deflection characteristics which result from the tapered configuration of vane 7 and its close proximity to the tapered side walls of the energizing coil make the instrument highly sensitive. To counteract any tendency of the pointer 6 to "hunt" or oscillate about a given point, a conventional damping mechanism, such as damping vane 19 moving through the field of a permanent magnet 20, is provided.

The calibration of the instrument utilizing a scale 6a having equally spaced points of indicia thereon may be accomplished as follows:

An electrical current of known magnitude is passed through the coil 3 and the plate member 8 is adjusted by means of screw 10 and nuts 11 and 12 to align the indicating pointer 6 to indicate the correct indicia on the printed scale. The current input is then adjusted to supply other magnitudes of current to the coil 3, and scale readings are taken over the operating range of the instrument. If the readings do not correspond within acceptable limits to the indicia on the printed scale over the entire range of the instrument, the plate member 8 may be repositioned and the spring torque adjusted to match the deflection torque gradients. The above steps may be repeated, if necessary.

Nuts 11 and 12 on screw 10 are then locked in position and the compensating screw or screws 13 are adjusted to positions along the air gap between vane 7 and plate member 8 to compensate for any unpredictable localized variations in the deflection characteristics of the indicating pointer 6. To accomplish this relatively fine adjustment of the deflection characteristics, another series of increments of current may be applied to the coil 3 and the position of the screw or screws 13 adjusted relative to the air gap to make the indicating pointer 6 correspond exactly with the respective desired indicia point on the printed scale.

While I have shown and described particular embodiments of my electrical measuring instrument, it will be obvious to those skilled in the art that various modifications may be made in the arrangement and configuration of the component parts of my instrument without departing from my invention in its broader aspects. Therefore, I intend in the following appended claims to encompass all such modifications as fall within the true scope of my invention.

What I claim as new and desire to secure by Letters Patent of the United States is:

1. An electrical current measuring instrument comprising a coil having an axial aperture and adapted to be energized by current flow therethrough, a movable vane of magnetizable material rotatably mounted in inductive relation to said coil, the axis of rotation of said vane being transverse to said aperture, said movable vane having a radial leg thereof disposed within the axial aperture of the coil and adapted to move therein between first and second limiting positions, biasing means opposing movement of said movable vane toward said second limiting position, an attraction plate member of magnetizable material having a planar surface, said planar surface being disposed transverse to the longitudinal axis of and extending substantially across said axial aperture, said planar surface being in inductive relation with the rotatably movable vane but having an air gap between it and said vane, and a second member of magnetizable material movably mounted in inductive relation with said vane and said planar member in the region of said air gap for varying the reluctance thereof.

2. An electrical measuring instrument as defined in claim 1 wherein means are provided for adjusting the position of said second member both longitudinally and transversely relative to one lateral edge of said first member.

3. An electrical current measuring instrument comprising a coil having an axial aperture and adapted to be energized by current flow therethrough, a movable vane of magnetizable material rotatably mounted in inductive relation with said coil, the axis of rotation of said movable vane being transverse to said aperture, said movable vane having a first radial leg thereof disposed within the axial aperture of the coil and adapted to move therein between first and second limiting positions, spring biasing means opposing movement of said movable vane toward said second limiting position, a first member of magnetizable material having a planar surface, said planar surface being disposed transverse to the longitudinal axis of said axial aperture and in inductive relation with the rotatably movable vane but having an air gap between it and said vane, a bracket of insulating material slidably mounted adjacent one edge of the air gap for longitudinal movement along said edge, a screw formed from magnetizable material, said bracket having a threaded aperture therein for receiving the magnetizable screw and supporting it in inductive relation with said vane and said first member in the region of said air gap, said screw being adjustable in said aperture transversely to the edge of said air gap, and said bracket and screw being adjustable longitudinally along said air gap, whereby said screw can be positioned to vary the reluctance of said air gap at any selected region thereof, said movable vane having a second radial leg disposed outside of said axial aperture, said first and second legs of said vane being of substantially equal length and in parallel relation, said first leg being of substantially uniform cross-sectional area over its entire length, and said second leg being tapered substantially uniformly from a maximum thickness near the central portion of the vane to a minimum thickness at the outer end of said leg, whereby the mass of the vane is reduced and the flux density induced in both legs of the vane when the coil is energized is substantially equal, said axial aperture having first and second walls formed to lie in planes that substantially intersect the axis of rotation of said rotatable vane to afford maximum angular movement of said vane between said limiting positions while maintaining a predetermined minimum coil size.

4. An electrical instrument as defined in claim 3, wherein a stationary repulsion vane is positioned proximate to one of said aperture walls.

5. An electrical current measuring instrument comprising a coil having an axial aperture and adapted to be energized by current flow therethrough, a movable vane of magnetizable material rotatably mounted in inductive relation with said coil, the axis of rotation of said movable vane being transverse to said aperture, said movable vane having a radial leg thereof disposed in the axial aperture of the coil and adapted to move therein between first and second limiting positions, said movable vane being biased to oppose movement thereof toward said second limiting position, said bias being effective to oppose movement of the vane with a progressively greater force as the vane moves toward said second limiting position, an attraction plate member of magnetizable material having a planar surface, said planar surface being disposed transverse to the longitudinal axis of said axial aperture and in inductive relation with said coil and the movable vane whereby an attractive force is established between the vane and said magnetizable member when the coil is energized, said member being so formed and so disposed that an air gap of varying length is formed between said member and said vane, said air gap varying from a maximum length when the vane is in its first limiting position to a minimum length when said vane is in its second limiting position, whereby the attractive force between the magnetizable member and the vane is varied to compensate for variations in the deflection characteristics of said vane as it moves between its first and second limiting positions.

6. An electrical current measuring instrument as defined in claim 5 wherein the length of the air gap varies substantially uniformly as the rotatably movable member moves toward its second limiting position.

7. An electrical measuring instrument as defined in claim 5 wherein means are provided for adjusting the length of said air gap.

8. An electrical current measuring instrument comprising a coil having an axial aperture and adapted to be energized by current flow therethrough, a movable vane of magnetizable material rotatably mounted in inductive relation with said coil, the axis of rotation of said movable vane being transverse to said aperture, said movable vane having a radial leg thereof disposed in the axial aperture of the coil and adapted to move therein between first and second limiting positions, said movable vane being biased to oppose movement thereof toward said second limiting position, an attraction plate member of magnetizable material having a substantially flat surface, said substantially flat surface being disposed transverse to the longitudinal axis of said axial aperture and in inductive relation with said coil and the movable vane, and means for adjusting the position of said magnetizable member relative to the movable vane whereby the inductive relation between said member and said vane may be varied over the entire path of movement of said rotatable vane.

9. An electrical current measuring instrument comprising a coil having an axial aperture and adapted to be energized by current flow therethrough, a movable vane of magnetizable material rotatably mounted in inductive relation to said coil, the axis of rotation of said movable vane being transverse to said aperture, said movable vane having a radial leg thereof disposed in the axial aperture of the coil and adapted to move therein between first and second limiting positions, biasing means for opposing movement of said movable vane toward said second limiting position, an attraction plate member of magnetizable material having a planar surface, said planar surface being disposed transverse to the longitudinal axis of said axial aperture and in inductive relation with said coil and the rotatably movable vane but having an air gap between it and said vane, the disposition of said member being such that the length of said air gap is reduced as the rotatably movable member moves toward its second limiting position.

10. An electrical measuring instrument comprising a coil having an axial aperture and adapted to be energized by current flow therethrough, a movable vane of magnetizable material rotatably mounted in inductive relation to said coil, the axis of rotation of said movable vane being transverse to said aperture, said rotatable vane being U-shaped and having one of its legs disposed in the axial aperture of said coil and its other leg disposed outside of said aperture, said latter leg of said rotatable vane being uniformly tapered from a maximum width adjacent the central portion of said rotatable vane to a minimum width at the outer end thereof, the axial aperture having first and second walls formed to lie in planes substantially intersecting the axis of rotation of said rotatable vane to afford maximum angular movement of said vane while maintaining a predetermiend minimum size coil.

11. An electrical instrument as defined in claim 10, wherein a stationary repulsion vane is positioned proximate to one of said aperture walls.

12. An electrical current measuring instrument comprising a coil having an axial aperture and adapted to be energized by current flow therethrough, a movable vane of magnetizable material rotatably mounted in inductive relation to said coil, the axis of rotation of said movable vane being transverse to said aperture, said movable vane having a first radial leg thereof disposed in the axial aperture of the coil and a second radial leg thereof disposed outside of said aperture whereby more magnetic flux is induced in said first leg than in said second leg when the coil is energized, said first and second legs being parallel and of substantially equal length, and said first leg having a greater cross-sectional area than said second leg whereby the flux density induced in both legs of the movable vane is substantially equal when the coil is energized.

13. An electrical current measuring instrument comprising a coil having an axial aperture and adapted to be energized by current flow therethrough, a movable vane of magnetizable material rotatably mounted in inductive relation to said coil, the axis of rotation of said movable vane being transverse to said aperture, said movable vane having a first radial leg thereof disposed in the axial aperture of the coil and a second radial leg thereof disposed outside of said aperture, said first and second legs of the movable vane being of substantially equal length and in parallel relation, said first leg being of substantially uniform cross-sectional area over its entire axial length, and said second leg varying uniformly in cross-sectional area over its entire axial length from a maximum at the axis of rotation thereof to a minimum at the end thereof remote from the axis of rotation, whereby the mass of the vane is reduced to a minimum and the flux density induced in both legs of the vane is substantially equal when the coil is energized.

14. An electrical current measuring instrument comprising a coil having an axial aperture and adapted to be energized by current flow therethrough, a movable vane of magnetizable material rotatably mounted in inductive relation to said coil, the axis of rotation of said movable vane being transverse to said aperture, said movable vane having a radial leg thereof disposed within the axial aperture of the coil and adapted to move therein between first and second limiting positions, said axial aperture having first and second walls formed to be in planes that intersect substantially the axis of rotation of said vane to afford maximum angular movement of said vane between said limiting positions while maintaining a predetermined minimum coil size.

15. An electrical instrument as defined in claim 14, wherein a stationary repulsion vane is positioned proximate to one of said aperture walls.

References Cited in the file of this patent

UNITED STATES PATENTS

| | | |
|---|---|---|
| 497,521 | Hoyt | May 16, 1893 |
| 1,719,556 | McCoy | July 2, 1929 |
| 2,015,474 | Hartley | Sept. 24, 1935 |
| 2,610,989 | Wiese | Sept. 16, 1952 |
| 2,628,993 | Hall | Feb. 17, 1953 |
| 2,841,767 | Hoare | July 1, 1958 |
| 2,865,001 | Millar | Dec. 16, 1958 |

FOREIGN PATENTS

| | | |
|---|---|---|
| 350,380 | Great Britain | June 1, 1931 |
| 566,230 | Great Britain | Dec. 19, 1944 |